US011946390B2

(12) United States Patent
Kurashima et al.

(10) Patent No.: US 11,946,390 B2
(45) Date of Patent: Apr. 2, 2024

(54) ROTOR BLADE AND DISC OF ROTATING BODY

(71) Applicant: KAWASAKI JUKOGYO KABUSHIKI KAISHA, Kobe (JP)

(72) Inventors: Hirotaka Kurashima, Kobe (JP); Hirokazu Matsuda, Kobe (JP); Ryoji Tamai, Kobe (JP); Ryozo Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/358,877

(22) Filed: Jun. 25, 2021

(65) Prior Publication Data

US 2021/0324750 A1 Oct. 21, 2021

Related U.S. Application Data

(63) Continuation of application No. PCT/JP2019/048856, filed on Dec. 13, 2019.

(30) Foreign Application Priority Data

Dec. 28, 2018 (JP) ................................ 2018-248016

(51) Int. Cl.
*F01D 5/30* (2006.01)
*F01D 5/32* (2006.01)
*F04D 29/32* (2006.01)

(52) U.S. Cl.
CPC ............ *F01D 5/3007* (2013.01); *F01D 5/32* (2013.01); *F04D 29/322* (2013.01); *F05D 2220/30* (2013.01); *F05D 2240/30* (2013.01)

(58) Field of Classification Search
CPC .... F01D 5/3007; F01D 5/3038; F04D 29/322; F04D 29/34
See application file for complete search history.

(56) References Cited

U.S. PATENT DOCUMENTS 5,554,005 A * 9/1996 Nguyen ................ F01D 5/3007 416/248
6,183,202 B1 2/2001 Ganshaw
2014/0140852 A1* 5/2014 Bluck .................. F01D 5/3007 416/219 R

FOREIGN PATENT DOCUMENTS

JP 2000-337294 A 12/2000
JP 2005-220825 A 8/2005

(Continued)

OTHER PUBLICATIONS

International Search Report of PCT/JP2019/048856 dated Mar. 3, 2020 [PCT/ISA/210].

*Primary Examiner* — Christopher Verdier
*Assistant Examiner* — Michael K. Reitz
(74) *Attorney, Agent, or Firm* — Sughrue Mion, PLLC

(57) ABSTRACT

Provided is a rotor blade configured to be implanted in a disc of a rotating body, the rotor blade including a blade root, wherein in a cross-sectional shape of the blade root, the blade root includes at least one stage of protruding parts protruding toward opposite sides with respect to a direction containing a circumferential component, the protruding parts being configured to lock the blade root to the disc, each of the protruding parts has a contact surface configured to come into contact with the disc and inclined so as to extend toward a center part of the blade root from radially inside to radially outside, and each of the protruding parts has a non-contact surface configured not to come into contact with the disc and inclined so as to extend toward the center part of the blade root from the radially inside to the radially outside.

11 Claims, 9 Drawing Sheets

(56) References Cited

FOREIGN PATENT DOCUMENTS

| | | | |
|---|---|---|---|
| JP | 2008-088832 | A | 4/2008 |
| JP | 2017-125478 | A | 7/2017 |

* cited by examiner

ROTOR BLADE AND DISC OF ROTATING BODY

CROSS REFERENCE TO THE RELATED APPLICATION

This application is a continuation application, under 35 U.S.C. § 111(a), of international application No. PCT/JP2019/048856, filed Dec. 13, 2019, which claims priority to Japanese patent application No. 2018-248016, filed Dec. 28, 2018, the entire disclosures of all of which are herein incorporated by reference as a part of this application.

BACKGROUND OF THE INVENTION

Field of the Invention

The present invention relates to a rotating body (such as a turbine rotor for a gas turbine engine or a steam turbine) including a plurality of rotor blades and a disc in which the rotor blades are implanted.

Description of Related Art

A rotating body for a turbomachine, such as a gas turbine and a steam turbine, includes a large number of rotor blades implanted therein at equal intervals. Each of the rotor blades has a blade root as an attaching part on an inner diametric side thereof, and the blade root is implanted in a blade groove of a disc disposed on an outer peripheral pan of the rotating body, so that the rotor blade is connected to the rotating body. The blade root typically has a tree shape having a plurality of circumferentially protruding parts because each rotor blade is required to be locked to the disc by fitting between the blade root and the blade groove (for example, see Patent Document 1).

RELATED DOCUMENT

Patent Document

[Patent Document 1] JP Laid-open Patent Publication No. 2017-125478

SUMMARY OF THE INVENTION

Since the rotating body for a turbomachine, such as a gas turbine and a steam turbine, rotates at high speed, stress due to a centrifugal force is often locally concentrated in attaching parts of the rotor blades having the above structure. As a technique for improving performance of the turbomachine, generally, it may be possible to further increase a rotation speed of the rotating body or to increase a height dimension of rotor blades. However, either technique would involve increase in stress due to an increased centrifugal force. That is, the stress occurring in the attaching parts of the rotor blades restricts improvement of performance of the turbomachine.

In order to solve the above problem, an object of the present invention is to improve the shape of a blade root of a rotor blade for a rotating body and the shape of a blade groove of a disc for a rotating body so as to mitigate a local stress concentration in the blade root of the rotor blade and the blade groove of the disc.

In order to achieve the above object, the present invention provides a rotor blade for a rotating body, the rotor blade being configured to be inserted into a disc of the rotating body, the rotor blade including a blade root, wherein in a cross-sectional shape of the blade root, the blade root includes at least one stage of protruding parts protruding toward opposite sides with respect to a direction containing a circumferential component, the protruding parts being configured to lock the blade root to the disc, each of the protruding parts has a contact surface configured to come into contact with the disc and inclined so as to extend toward a center part of the blade root from radially inside to radially outside, and each of the protruding parts has a non-contact surface configured not to come into contact with the disc and inclined so as to extend toward the center part of the blade root from the radially inside to the radially outside.

The present invention also provides a disc for a rotating body, the disc being configured to be implanted with a rotor blade, the disc including a blade groove, wherein in a cross-sectional shape of the blade groove, the blade groove includes at least one stage of recessed parts recessed toward opposite sides with respect to a direction containing a circumferential component, the recessed parts being configured to lock a blade root of the rotor blade to the disk, each of the recessed parts has a contact surface configured to come into contact with the blade root and inclined so as to extend toward a center part of the blade groove from radially inside to radially outside, and each of the recessed parts has a non-contact surface configured not to come into contact with the blade root and inclined so as to extend toward the center part of the blade groove from the radially inside to the radially outside.

In conventional shapes of a blade root and a blade groove, the non-contact surfaces are inclined so as to extend toward the center part from the radially outside to the radially inside (i.e., they are inclined at a positive angle). In such conventional shapes, a large stress concentration occurs in opposite end portions of contact parts on the contact surfaces and in circular-arc recessed parts (R-shaped parts) of the blade root and the blade groove, which are adjacent to the contact end portions. According to the rotor blade and the disc having the constitutions of the present invention, the non-contact surfaces are inclined at a negative angle, i.e., in an opposite manner to that in the conventional shapes, so that a stress concentration in the contact end portions and the R-shaped parts can be mitigated without increasing the entire dimensions of the blade root and the blade groove.

In the rotor blade according to one embodiment of the present invention, each of the protruding parts of the blade root may have a tapered cross-sectional shape. In the disc according to one embodiment of the present invention, each of the recessed parts of the blade groove may have a tapered cross-sectional shape. According to this constitution, the center of gravity of distribution of the rigidity in each protruding part is shifted to the distal side, so that a load transmission path can be more reliably shifted to the center part of the contact part to mitigate a stress concentration in the contact end portions.

In the rotor blade according to one embodiment of the present invention, the blade root may include a plurality of stages of the protruding parts. In the disc according to one embodiment of the present invention, the blade groove may include a plurality of stages of the recessed parts. According to this constitution, the rotor blade can be more reliably locked in the blade groove of the disc, as compared with a case where the rotor blade includes only a single stage of the protruding parts.

In the rotor blade according to one embodiment of the present invention, the blade root may have an inner diametric side end portion formed with an inner diametric side recessed part recessed toward the radially outside. According to this constitution, the weight of the rotor blade is reduced, so that a smaller centrifugal force acts on the rotor blade, and consequently, a smaller stress occurs in the blade root and the blade groove as a whole. Further, the non-contact surfaces of the protruding parts of the inner diametric side end portion are also inclined at a negative angle, so that the center of gravity of the distribution of the rigidity is shifted to the distal side, and a stress concentration in the contact end portions is mitigated.

The present invention provides a rotating body including a plurality of rotor blades implanted in the rotating body, the rotor blades being constructed according to any one of the above constitutions, and

- a disc constructed according to any one of the above constitutions, the disc having blade grooves shaped so as to receive blade roots of the rotor blades.

In the rotating body according to one embodiment of the present invention, in the cross-sectional shape of the rotating body, each of the blade groove may have an inner diametric side end portion having a non-contact surface configured not to come into contact with a corresponding blade root, the non-contact surface having a larger radius of curvature than that of a non-contact surface of the inner diametric side end portion of the blade root. According to this constitution, the recessed part of the inner diametric side end portion of the blade groove has a large radius of curvature, so that a stress concentration at this location can be mitigated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Hereinafter, an embodiment according to the present invention will be described with reference to the drawings.

Figure 1:
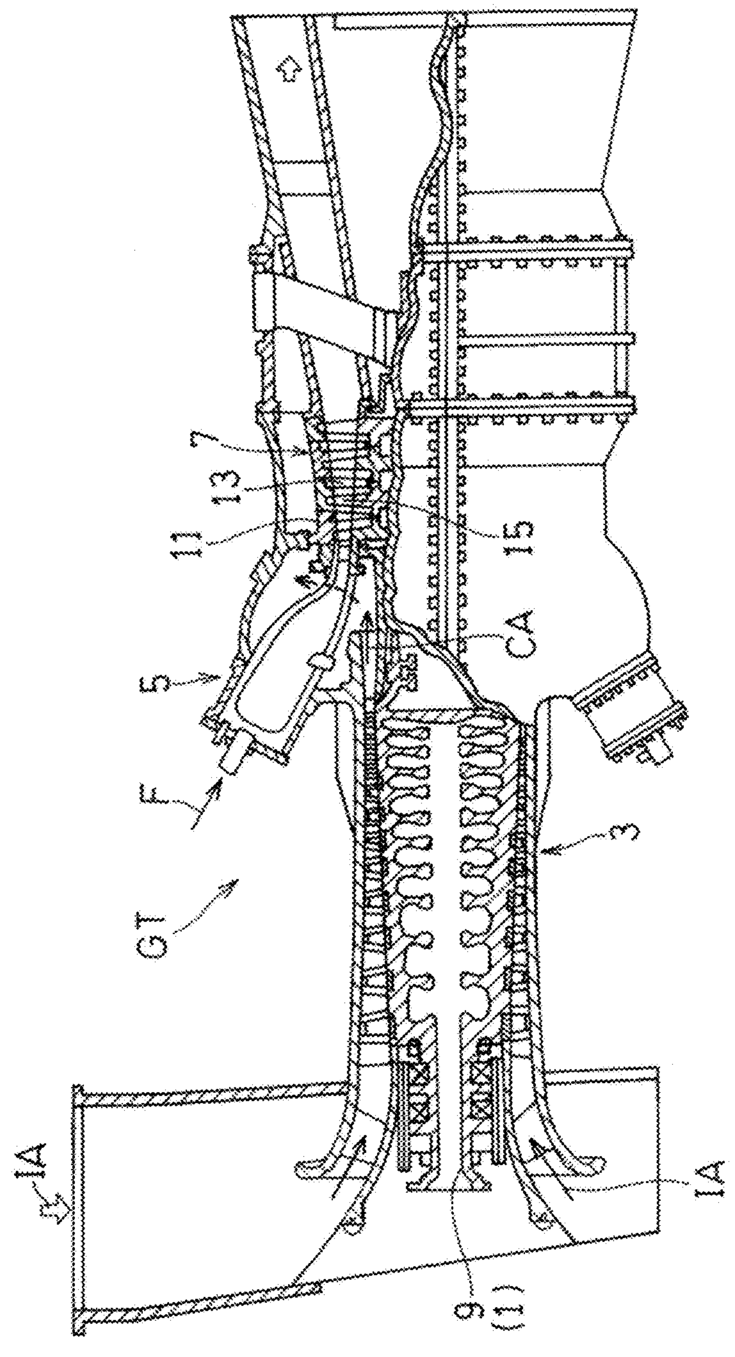
FIG. 1 is a partial cutaway side view illustrating schematic features of a gas turbine to which a rotating body according to a first embodiment of the present invention is applied.
Figure 2:
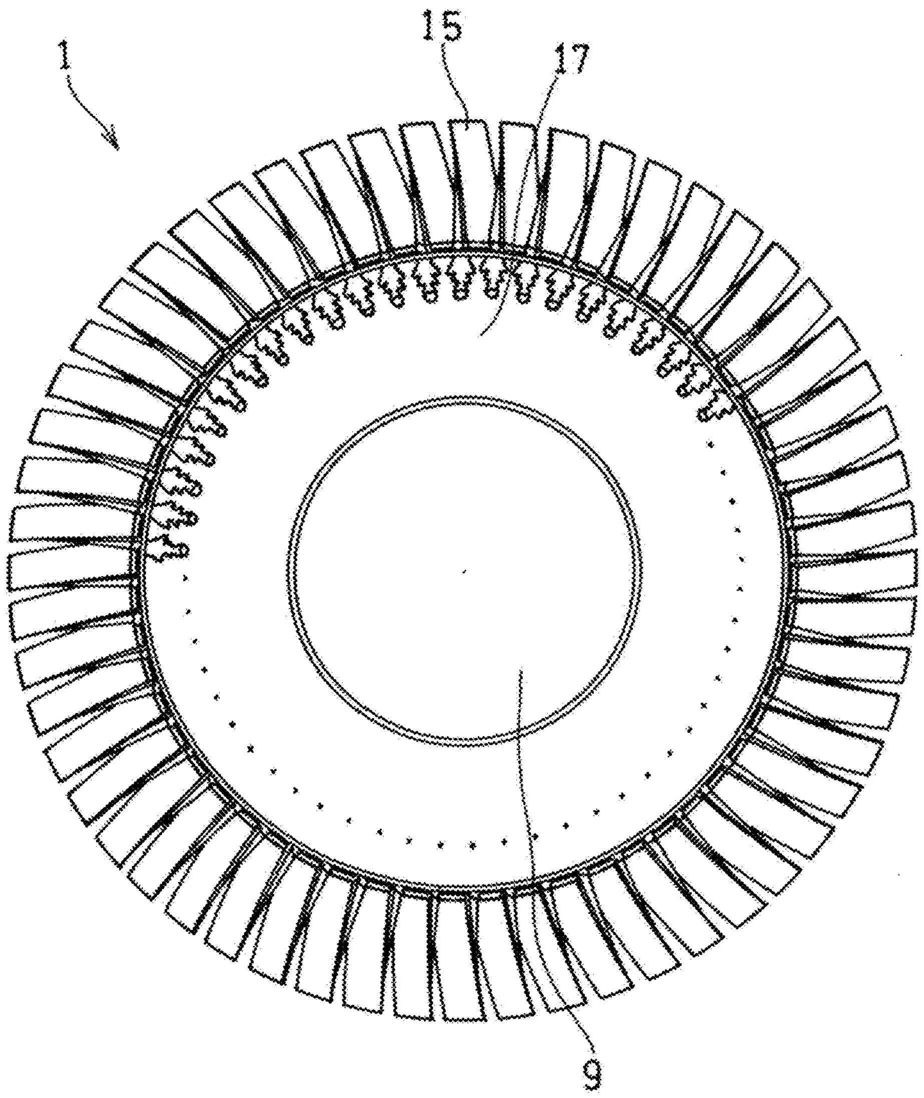
FIG. 2 is a front view of the rotating body according to the first embodiment of the present invention.

FIG. 1 shows an example of a turbomachine in which a rotating body 1 according to a first embodiment of the present invention is applied. FIG. 1 shows a gas turbine GT as an example of the turbomachine. The gas turbine GT compresses intake air IA from outside by a compressor 3 to produce compressed air CA, guides the compressed air CA to a combustor 5 and combusts the compressed air together with fuel F injected into the combustor 5 to produce combustion gas having high temperature and high pressure, and drives a turbine 7 using the combustion gas. Rotation of the turbine 7 drives a load (not illustrated) such as a power generator connected to a rotor, which is a rotary shaft 9 constituting the rotating body 1, The turbine 7 includes a large number of stator vanes 13 implanted in an inner peripheral part of a turbine casing 11 and a large number of rotor blades 15 provided on an outer peripheral part of the rotor, the stator vanes and the rotor blades being alternately arranged adjacent to each other in an axial direction of the rotating body. Specifically, as shown in FIG. 2, the large number of rotor blades 15 are coupled to an outer peripheral part of a disc 17 provided to the rotating body 1 and thereby are implanted therein in a circumferential direction of the rotating body.

Figure 3:
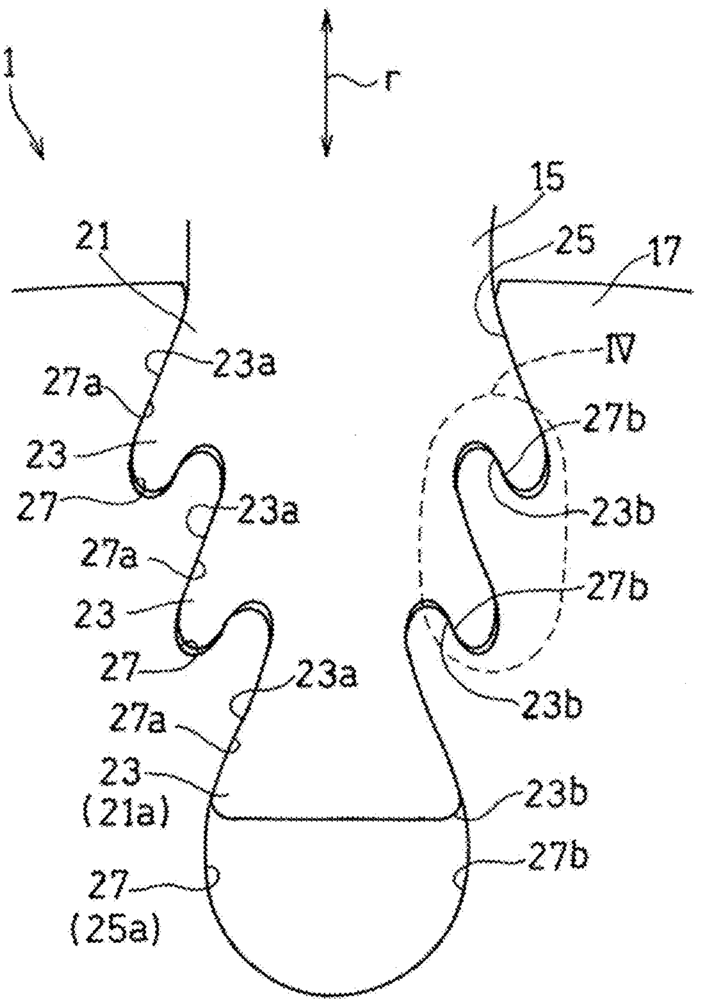
FIG. 3 is a front view illustrating an attaching part of a rotor blade of the rotating body of FIG. 2 in an enlarged manner.

The rotating body 1 includes: the rotary shaft 9; the disc 17 disposed on an outer peripheral surface of the rotary shaft 9 so as to protrude in a disc-like manner; and the plurality of rotor blades 15 circumferentially arranged on the outer peripheral part of the disc 17. Each of the rotor blades 15 includes a blade root 21. The blade root 21 is an inner diametric part of the rotor blade 15, which is fittedly coupled to the disc 17. As shown in FIG. 3, the blade root 21 of the rotor blade 15 includes protruding parts 23 protruding toward opposite sides with respect to a direction containing a circumferential component, the protruding parts being configured to lock the blade root 21 to the disc 17. The blade root 21 of each rotor blade 15 is shaped so as to have a substantially line-symmetric cross section with respect to a radial direction r of the rotating body 1. In the present specification, the "cross section" (or cross sectional) refers to a section along a transverse direction of the rotating body 1.

The disc 17 has blade grooves 25 in the outer peripheral part thereof. Each of the blade grooves 25 is shaped so as to receive a blade root 21 of a rotor blade 15 and is configured to receive the blade root 21 by fitting. The blade groove 25 is shaped such that the blade root 21 can be received, and includes recessed parts 27 recessed toward opposite sides with respect to a direction containing a circumferential component, the recessed parts being configured to lock the blade root 21 of the rotor blade 15 to the disc 17. Each blade groove 25 of the disc 17 is shaped so as to have a substantially line-symmetric cross section with respect to the radial direction r of the rotating body 1. In the present specification, a "stage" refers to one pair of protruding parts 23 protruding toward the opposite sides of the blade root 21 in the circumferential direction and a corresponding pair of recessed parts 27 recessed toward the opposite sides of the blade groove 25 in the circumferential direction at a same radial position. In the illustrated example, the blade root 21 of the rotor blade 15 has a plurality of stages (3 stages in this example) of protruding parts 23. The blade groove 25 of the disc 17 also has a plurality of stages (3 stages in this example) of recessed parts 27. In the present specification, in a case where the blade root 21 and the blade groove 25 have multiple stages, the stages are sequentially denoted as "n-th stage" starting from radially outside. That is, a radially outermost stage is referred to as the first stage.

As the rotating body 1 rotates, a centrifugal force acts on each rotor blade 15. Thus, during operation of a device (in this embodiment, the gas turbine GT as shown in FIG. 1) in which the rotating body 1 is installed, each protruding part 23 of the blade root 21 has a face mainly facing the radially outside serving as a contact surface 23*a* in contact with a surface of a blade groove 25 of the disc 17 and a face mainly facing radially inside serving as a non-contact surface 23*b*. Similarly, each recessed part 27 of the blade grooves 25 has a face mainly facing the radially inside serving as a contact surface 27*a* in contact with a blade root 21 and a face mainly facing the radially outside serving as a non-contact surface 27*b*.

The contact surface 23*a* of each protruding part 23 of the blade root 21 is inclined so as to extend toward a center part of the blade root 21 from the radially inside to the radially outside, as seen in a cross section. Similarly, the contact surface 27*a* of each recessed part 27 of the blade groove 25 is also inclined so as to extend toward a center part of the blade groove 25 from the radially inside to the radially outside, as seen in a cross section. In the following description, a "positive" angle refers to such an inclination angle defined by a line inclinedly extending toward the center part of the blade root 21 or the blade groove 25 in a direction from the radially outside to the radially inside (in other words, an inclination angle of a line inclinedly extending away from the center part of the blade root 21 or the blade groove 25 in a direction from the radially inside to the radially outside), and a "negative" angle refers to an opposite angle to the positive angle. That is, a negative angle is defined as an inclination angle of a line inclinedly extending toward the center part of the blade root 21 or the blade groove 25 in a direction from the radially inside toward the radially outside (in other words, an inclination angle of a line inclinedly extending so as to approach the center part of the blade root 21 or the blade groove 25 in a direction from the radially inside to the radially outside). The contact surfaces 23*a*, 27*a* of the protruding parts 23 of the blade root 21 and of the recessed parts 27 of the blade groove 25 are inclined at a negative angle.

In the present embodiment, in the blade root 21 of the rotor blade 15, at least one stage of the protruding parts 23 have non-contact surfaces 23*b* inclined at a negative angle. Similarly, in the blade groove 25 of the disc 17, at least one stage of the recessed parts 27 have non-contact surfaces 27*b* inclined at a negative angle.

More specifically, in the illustrated example, the non-contact surfaces 23*b* of the protruding parts 23 of all stages (in this example, the first stage and the second stage) other than the non-contact surface of the last stage (in this example, the third stage) of the blade root 21 are inclined at a negative angle. The non-contact surface 23*b* of the last stage, which is an inner diametric side end portion 21*a* of the blade root 21, is formed as a flat surface substantially perpendicular to the radial direction r. Similarly, the non-contact surfaces 27*b* of the recessed parts 27 of all other stages (in this example, the first stage and the second stage) other than the non-contact surface of the last stage (in this example, the third stage) of the blade groove 25 are inclined at a negative angle. The non-contact surface 27*b* of the last stage, which is an inner diametric side end portion 25*a* of the blade groove 25, is formed as a curved surface recessed toward the radially inside as a whole. It should be noted that the shape of the recessed parts 27 of all stages (in this example, the first stage and the second stage) other than that of the last stage (in this example, the third stage) of the blade groove 25 of the disc 17 substantially matches to the shape of the protruding parts 23 of the corresponding stages of the blade root 21 of the rotor blade 15. Therefore, in the following section, the description of the shape of the recessed parts 27 of the blade groove 25 may be omitted.

In the rotor blade 15 and the disc 17 of the present embodiment, the non-contact surfaces 23*b*, 27*b* of the protruding parts 23 of the blade root 21 and the recessed parts 27 of the blade groove 25 are shaped so as to extend inclinedly at a negative angle, so that it is possible to suppress generation of a local stress concentration at the blade root 21 and the blade groove 25. This effect will be described in detail below.

Figure 9:
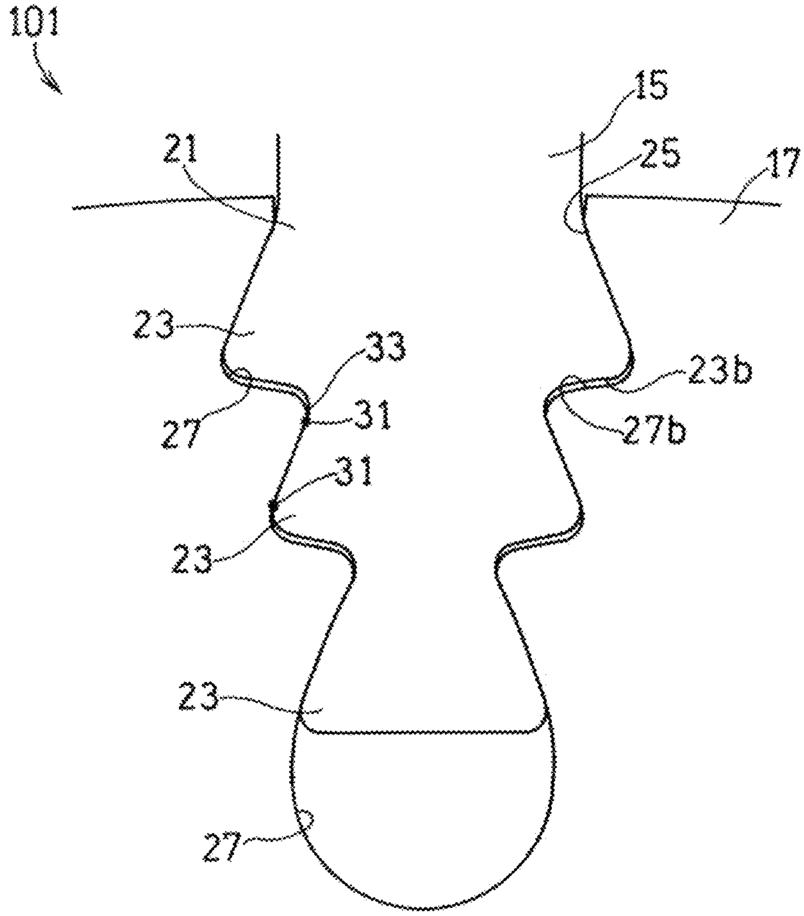
FIG. 9 is a front view showing the conventional shapes of a blade root of a rotor blade and a blade groove of a disc.

FIG. 9 shows the shapes of a blade root 21 of a rotor blade 15 and a blade groove 25 of a disc 17 for a rotating body 101 according to a general and conventional example. In this conventional example, the non-contact surfaces 23*b*, 27*b* are inclined at a positive angle, unlike those of the blade root 21 and the blade groove 25 according to the present embodiment. In the blade root 21 and the blade groove 25 according to such a conventional example, a great stress concentration occurs in (1) opposite end portions (hereinafter, simply referred to as "contact end portions") 31, 31 of contact parts on the contact surfaces and (2) circular-arc recessed parts (hereinafter, simply referred to as "R-shaped parts") 33 of the blade root 21 and the blade groove 25, which are adjacent to the contact end portions 31.

First, in order to reduce a stress concentration in the contact end portions 31, it is necessary to shift a path of a centrifugal load acting on the blade root 21 and the blade groove 25 from the opposite contact end portions 31, 31 to center parts of the contact parts. Since a load tends to pass through a part where the rigidity is high, it is effective to shift the center of gravity of distribution of the rigidity in each protruding part 23 of the blade root 21 toward the distal side of the protruding part in order to shift the path of the centrifugal load as mentioned above. On the other hand, in order to reduce a stress concentration in each R-shaped part 33, it is effective to increase a radius of curvature of the R-shaped part 33. As in the present embodiment, the inclination of the non-contact surfaces of the blade root 21 and the blade groove 25 at a negative angle makes it possible to achieve such a shape modification to provide the above effect in the blade root 21 and the blade groove 25, without increasing the radial and circumferential dimensions of the blade root 21 and the blade groove 25.

More specifically, as shown in FIG. 3, the rotor blade 15 according to the present embodiment is constructed such that besides the contact surfaces 23*a* of the protruding parts 23 of the blade root 21, the non-contact surfaces 23*b* are also inclined at a negative angle, so that each of the protruding parts 23 has an elongated cross-sectional shape, as compared to a conventional shape. That is, each protruding part 23 has a smaller and uniform width dimension over the entire protruding part 23. The same applies to protruding parts between the recessed parts 27, 27 of the blade groove 25. Because of such a shape, the centers of gravity of the distribution of the rigidity in these protruding parts are shifted toward the distal sides as compared with those in the conventional shape, so that a stress concentration in the contact end portions 31 is mitigated.

Figure 4:
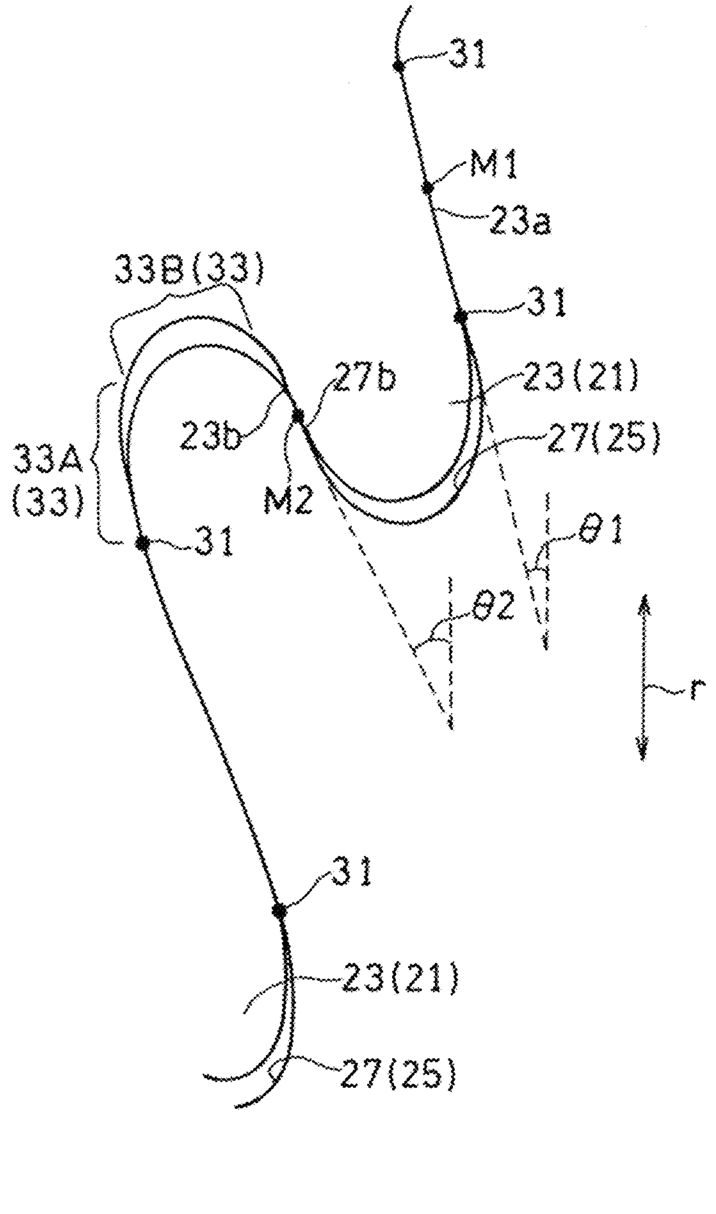
FIG. 4 is a front view illustrating part IV of FIG. 3 in an enlarged manner.

Further, the elongated cross-sectional shape of each of the protruding parts 23 makes it easy to have a larger radius of curvature in non-contact parts adjacent to the contact end portions 31. In this example, as shown in FIG. 4, the R-shaped part 33 located closer to an attachment side of the protruding part 23 with respect to the contact end portions 31 of the protruding part 23 is formed in a curved shape having two sections with different radii of curvature. As used herein, a section of the R-shaped part 33 which is adjacent to one contact end portion 31 is called as a "first R-shaped part 33A," and a section of the R-shaped part 33 which is adjacent to the first R-shaped part 33A and forms a tip end portion of the protruding part 23 is called as a "second R-shaped part 33B." In a similar manner, in the conventional shape as shown in FIG. 9, each of the R-shaped parts 33 adjacent to the contact end portions 31 is are formed in a curved shape having two sections with different radii of curvature. The first R-shaped part 33A of the present embodiment has a radius of curvature approximately three times larger than the radius of curvature of the first R-shaped part of the R-shaped parts of the conventional shape.

Figure 5:
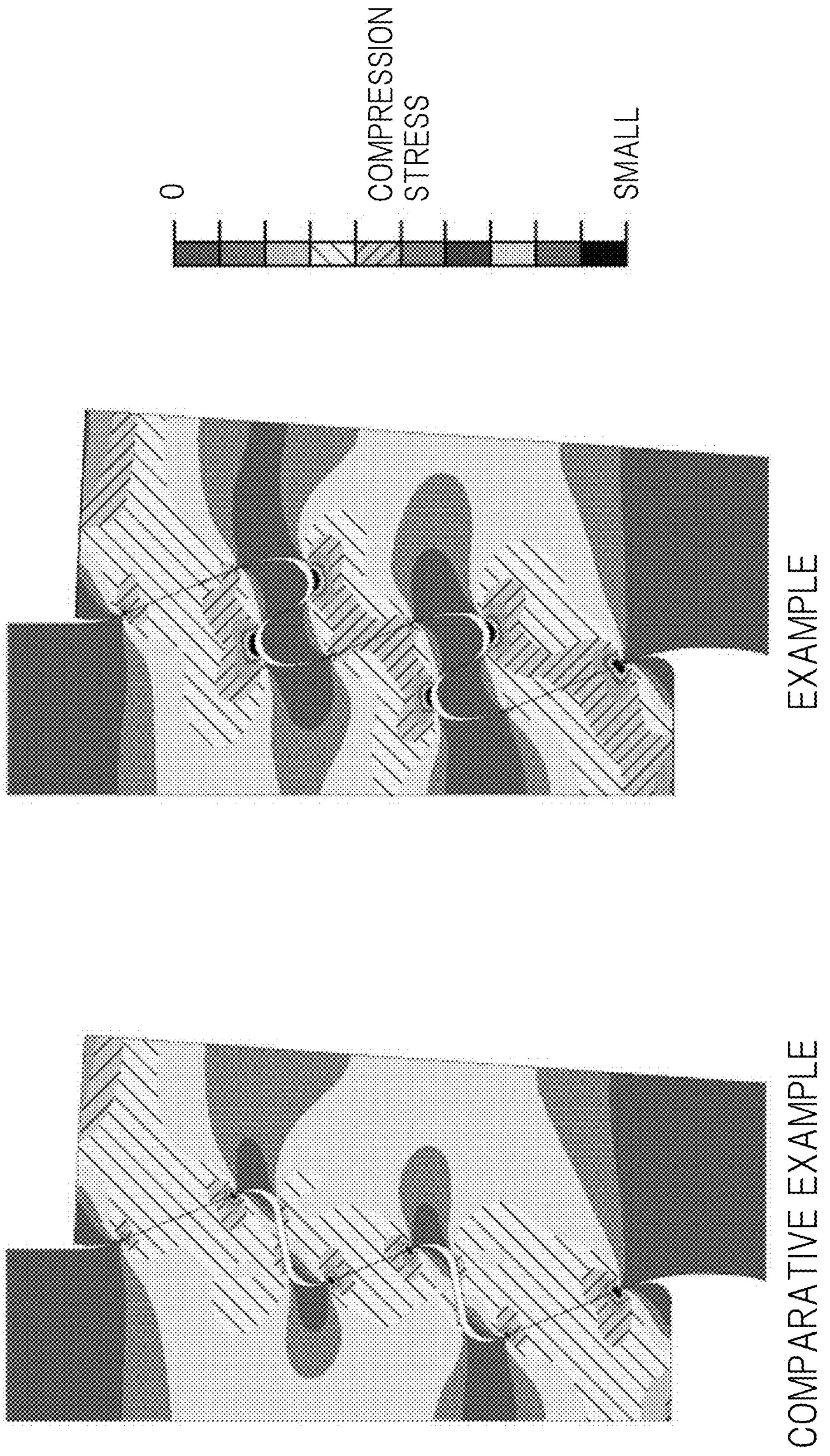
FIG. 5 is a contour diagram showing calculation results relating to the effect of the embodiment of FIG. 3.
Figure 6:
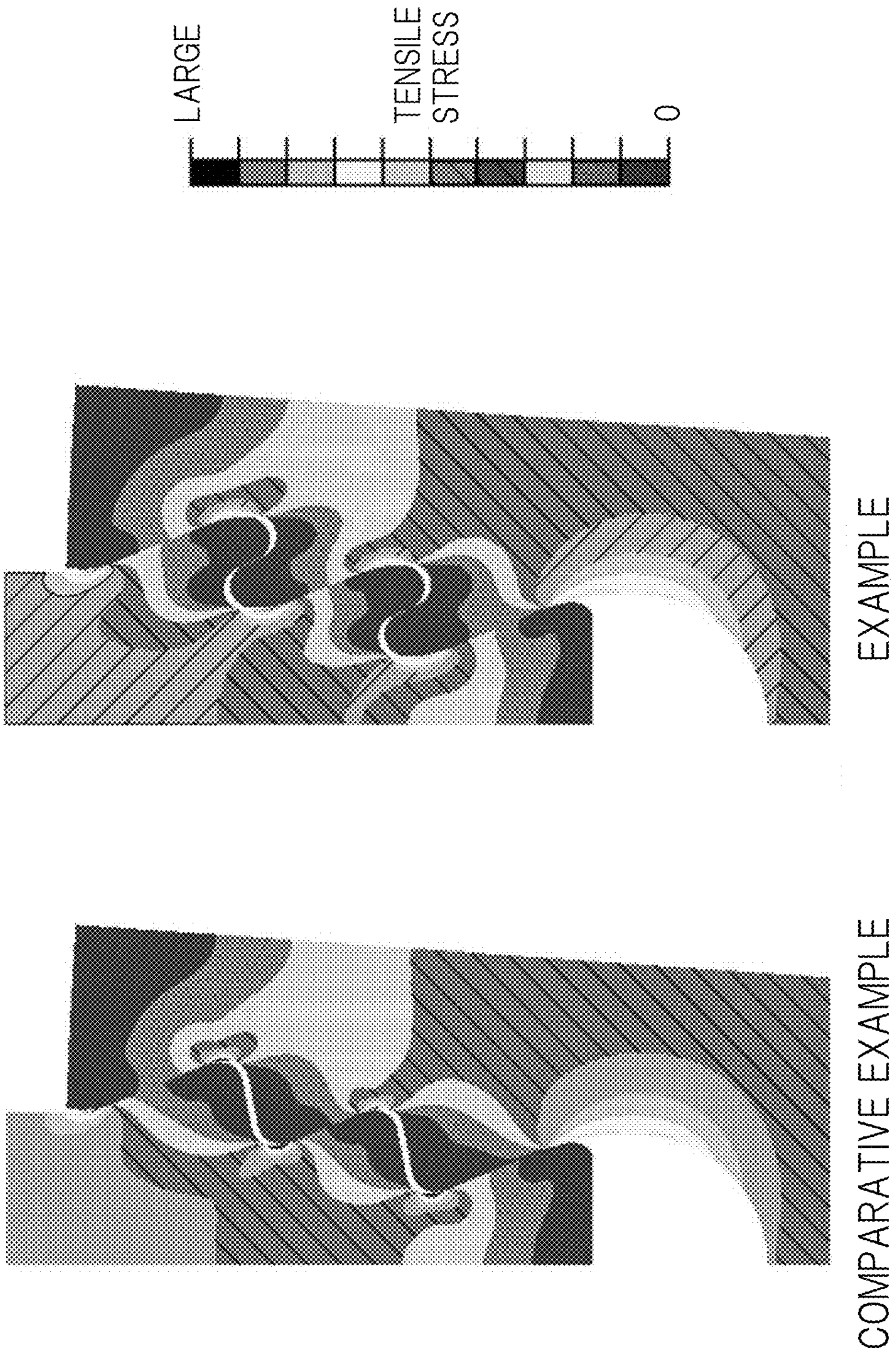
FIG. 6 is a contour diagram showing calculation results relating to the effect of the embodiment of FIG. 3.

FIG. 5 and FIG. 6 show calculation results of a simulated stress concentration state in the shape according to the present embodiment (the shape shown in FIG. 3: example) and in the conventional shape (the shape shown in FIG. 9: comparative example). FIG. 5 shows the results of calculation of a magnitude of a minimum main stress (i.e., a maximum compression stress in these portions) in the example and the comparative example. FIG. 6 shows the results of calculation of a magnitude of a maximum main stress (i.e., a maximum tensile stress in these portions) in the example and the comparative example. It should be noted that the contact parts between the blade root and the blade groove have same lengths in the example and the comparative example.

From the results shown in FIG. 5, it can be seen that concentration of the compression stress occurring in the contact end portions in the comparative example is greatly mitigated in the example. Similarly, from the results shown in FIG. 6, it can be seen that concentration of the tensile stress occurring in the R-shaped parts in the comparative example is greatly mitigated in the example.

Even in the conventional shape as shown in FIG. 9, for example, it is possible to form the protruding parts 23 of the blade root 21 and the recessed parts 27 of the blade groove 25 in elongate shapes if the circumferential dimensions of the blade root 21 and the blade groove 25 are permitted to increase, and to increase the radius of curvature of the R-shaped parts 33 if the radial dimensions of the blade root 21 and the blade groove 25 are permitted to increase. However, it is difficult to achieve the shape modification including these two factors while maintaining the circumferential dimensions and the radial dimensions of the blade root 21 and the blade groove 25 as a whole. In the present embodiment as shown in FIG. 3, however, inclination of the non-contact surfaces 23*b*, 27*b* of the blade root 21 and the blade groove 25 at a negative angle makes it possible achieve such a shape modification, without increasing the overall dimensions of the blade root 21 and the blade groove 25.

In the present embodiment, further, each of the protruding parts 23 of the first stage and the second stage of the blade root 21 is formed in a tapered cross-sectional shape. That is, in each of these protruding parts 23 as shown in FIG. 4, the non-contact surface 23*b* has a larger inclination angle θ2 with respect to the radial direction r than an inclination angle θ1 of the contact surface 23*a* with respect to the radial direction r. Similarly, each of the recessed parts 27 of the first stage and the second stage of the blade groove 25 is formed in a tapered cross-sectional shape. That is, in each of these recessed parts 27, the non-contact surface 27*b* has a larger inclination angle θ2 with respect to the radial direction r than an inclination angle θ1 of the contact surface 27*a* with respect to the radial direction r. The inclination angle θ1 of the contact surface refers to an angle of inclination with respect to the radial direction r at a midpoint M1 between the opposite contact end portions 31, 31 of the contact surface, and the inclination angle θ2 of the non-contact surface refers to an angle of inclination with respect to the radial direction r at a midpoint M2 between opposite contact end portions of contact surfaces in a state where the non-contact surfaces are in contact with each other because no centrifugal force is acting on the rotating body 1. That is, in a case where the contact surfaces and the non-contact surfaces have a linear shape as a whole when viewed in their cross section, an inclination angle of the line (i.e., the inclination angle at the midpoint) is the "inclination angle θ1" or "inclination angle θ2," and in a case where the contact surfaces and the non-contact surfaces have a corrugated or curved shape when viewed in their cross section, the inclination angle at the midpoint is the "inclination angle θ1" or "inclination angle θ2."

Such a constitution makes it possible to shift the center of gravity of the distribution of the rigidity in the protruding parts 23 toward the distal sides, so that a load path can be more reliably shifted to the center parts of the contact parts to mitigate a stress concentration in the contact end portions 31.

Further, in the present embodiment, as shown in FIG. 3, the non-contact surface 27*b* of the inner diametric side end portion 25*a* (the recessed parts 27 of the last stage) of the blade groove 25 of the disc 17 has a larger radius of curvature than that of the non-contact surface 23*b* of the inner diametric side end portion 21*a* (the protruding parts 23 of the last stage) of the blade root 21 of the rotor blade 15 when viewed in their cross-sectional shape. The non-contact surface 27*b* of the inner diametric side end portion 25*a* of the blade groove 25 preferably has a largest possible radius of curvature to the extent that the entire dimensions of the disc 17 can be sustained, and sufficient performance can be secured in supporting the rotor blade 15. Thus, the recessed parts 27 of the inner diametric side end portion 25*a* of the blade groove 25 are also shaped so as to have a large radius of curvature, so that a stress concentration at these portions can be mitigated.

According to the rotor blade 15 and the disc 17 for the rotating body 1 of the present embodiment as well as the rotating body 1 including these components as described above, the non-contact surfaces 23*b*, 27*b* are inclined at a negative angle, so that a stress concentration in the contact end portions 31 and the R-shaped parts 33 can be mitigated, without increasing the entire dimensions of the blade root 21 and the blade groove 25.

Figure 7:
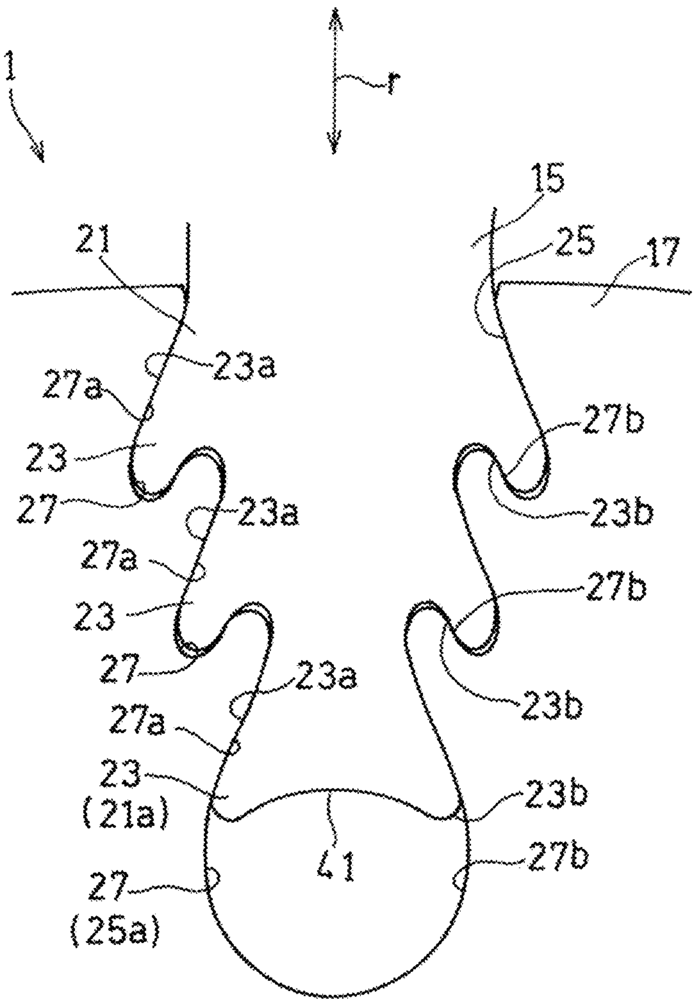
FIG. 7 is a front view showing an attaching part of a rotor blade of a rotating body according to a second embodiment of the present invention in an enlarged manner.

FIG. 7 shows a rotating body 1 according to a second embodiment of the present invention. In the present embodiment, the non-contact surface 23*b* of the last stage, which is the inner diametric side end portion 21*a*, of the blade root 21 of the rotor blade 15 is formed with an inner diametric side recessed part 41 recessed toward the radially outside. Other features of the present embodiment are the same as those of the first embodiment as shown in FIG. 3.

Thus, formation of the inner diametric side recessed part 41 on the inner diametric side end portion 21*a* of the blade root 21 of the rotor blade 15 makes it possible to reduce a thickness of a part which does not substantially contribute to supporting the rotor blade 15, so that the weight of the rotor blade 15 can be reduced. Accordingly, a smaller centrifugal force acts on the rotor blade 15, and consequently, a smaller stress occurs in the blade root 21 and the blade groove 25 as a whole. Further, since the inner diametric side recessed part 41 is formed on the inner diametric side end portion 21*a*, which corresponds to the protruding parts 23 of the last stage of the blade root 21, the non-contact surfaces 23*b*, 27*b* of the protruding parts 23 of the last stage are also inclined at a negative angle. Thus, the centers of gravity of the distribution of the rigidity in the protruding parts 23 of the last stage are shifted to the distal sides, so that a stress concentration in the contact end portions 31 is mitigated.

Figure 8:
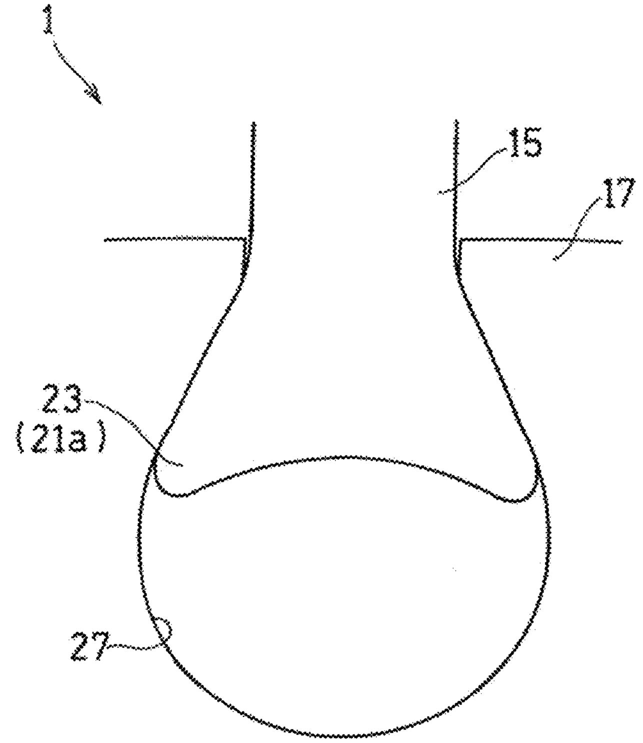
FIG. 8 is a front view of a rotating body according to a variant of the embodiment of FIG. 7.

The above embodiments are described with reference to the example in which the blade root 21 includes a plurality of stages of the protruding parts 23. This constitution makes it possible to more reliably lock the rotor blade 15 in the blade groove 25 of the disc 17. As shown in FIG. 8, however, the blade root 21 of the rotor blade 15 may include a single stage of the protruding parts 23, and the blade groove 25 of the disc 17 may include a single stage of the recessed parts 27. Even in such a case, the only non-contact surface 23*b* of the protruding parts 23, which is the inner diametric side end portion 21*a* of the blade root 21, is inclined at a negative angle so as to form the inner diametric side recessed part 41 on the inner diametric side end portion 21*a*.

The rotor blade 15 and the disc 17 for the rotating body 1 as well as the rotating body 1 including these components according to the present invention may be applied not only to a turbine of a gas turbine as exemplarily described in the above embodiments, but also to various turbomachines such as a compressor of a gas turbine and a steam turbine.

Although the preferred embodiments of the present invention have been described with reference to the drawings, various additions, modifications, or deletions may be made without departing from the scope of the invention. Accordingly, such variants are included within the scope of the present invention.

REFERENCE NUMERALS

1 . . . rotating body
15 . . . rotor blade
17 . . . disc
21 . . . blade root
23 . . . protruding part
25 . . . blade groove
27 . . . recessed part

What is claimed is:

1. A rotor blade configured to be implanted in a disc of a rotating body, the rotor blade comprising a blade root, wherein in a cross-sectional shape of the blade root, the blade root includes at least one stage of protruding parts protruding toward opposite sides with respect to a direction containing a circumferential component, the protruding parts being configured to lock the blade root to the disc, each of the protruding parts has a contact surface configured to come into contact with the disc, inclined so as to extend toward a center part of the blade root from a radially inside to a radially outside, and facing towards the radially outside, each of the protruding parts has a non-contact surface configured not to come into contact with the disc, inclined so as to extend toward the center part of the blade root from the radially inside to the radially outside, and facing towards the radially inside, and each of the protruding parts is configured to protrude, from the center part of the blade root, moreso in a radial direction towards a radial center of the disc than in a circumferential direction away from the center part of the blade root.

2. The rotor blade as claimed in claim 1, wherein each of the protruding parts of the blade root has a tapered cross-sectional shape.

3. The rotor blade as claimed in claim 1, wherein the blade root includes a plurality of stages of the protruding parts.

4. The rotor blade as claimed in claim 3, wherein the blade root includes an inner diametric side end portion formed with an inner diametric side recessed part recessed toward the radially outside.

5. A disc of a rotating body, the disc being configured to be implanted with a rotor blade, the disc comprising a blade groove, wherein in a cross-sectional shape of the blade groove, the blade groove includes at least one stage of recessed parts recessed toward opposite sides with respect to a direction containing a circumferential component, the recessed parts being configured to lock a blade root of the rotor blade to the disk, each of the recessed parts has a contact surface configured to come into contact with the blade root, inclined so as to extend toward a center part of the blade groove from a radially inside to a radially outside, and facing towards the radially inside, and each of the recessed parts has a non-contact surface configured not to come into contact with the blade root, inclined so as to extend toward the center part of the blade groove from the radially inside to the radially outside, and facing towards the radially outside, and each of the recessed parts is configured to recess, away from a center part of the blade root, moreso in a radial direction towards a radial center of the disc than in a circumferential direction away from the center part of the blade root.

6. The disc as claimed in claim 5, wherein each of the recessed parts of the blade groove has a tapered cross-sectional shape.

7. The disc as claimed in claim 5, wherein the blade groove include a plurality of stages of the recessed parts.

8. A rotating body comprising:

a plurality of rotor blades, each rotor blade configured to be implanted in a disc of a rotating body, the rotor blade comprising a blade root, wherein in a cross-sectional shape of the blade root, the blade root includes at least one stage of protruding parts protruding toward opposite sides with respect to a direction containing a circumferential component, the protruding parts being configured to lock the blade root to the disc, each of the protruding parts has a contact surface configured to come into contact with the disc, inclined so as to extend toward a center part of the blade root from radially inside to a radially outside, and facing towards the radially outside, each of the protruding parts has a non-contact surface configured not to come into contact with the disc, inclined so as to extend toward the center part of the blade root from the radially inside to the radially outside, and facing towards the radially inside, and each of the protruding parts is configured to protrude, from the center part of the blade root, moreso in a radial direction towards a radial center of the disc than in a circumferential direction away from the center part of the blade root the rotor blades being implanted in the rotating body; and a disc of a rotating body, the disc being configured to be implanted with a rotor blade, the disc comprising blade grooves, wherein in a cross-sectional shape of a blade groove of the blade grooves, the blade groove includes at least one stage of recessed parts recessed toward opposite sides with respect to a direction containing a circumferential component, the recessed parts being configured to lock a blade root of the rotor blade to the disk, each of the recessed parts has a contact surface configured to come into contact with the blade root, inclined so as to extend toward a center part of the blade groove from radially inside to radially outside, and facing towards the radially inside, and each of the recessed parts has a non-contact surface configured not to come into contact with the blade root, inclined so as to extend toward the center part of the blade groove from the radially inside to the radially outside, and facing towards the radially insideoutside, the disc having blade grooves shaped so as to receive blade roots of the rotor blades.

9. The rotating body as claimed in claim 8, wherein in the cross-sectional shape of the rotating body, a recessed part of a stage of the recessed parts which are located at an inner diametric side end portion of each of the blade grooves has the non-contact surface configured not to come into contact with a corresponding blade root and having a larger radius of curvature than that of the non-contact surface of a protruding part of a stage of the protruding parts which are located at an inner diametric side end portion of the blade root.

10. The rotor blade as claimed in claim 1, wherein, in the cross-sectional shape of the blade root and along a longitudinal direction of each of each of the protruding parts, a portion of each of the protruding parts furthest extended in the longitudinal direction comprises a curved surface facing towards the radially inside.

11. The rotor blade as claimed in claim 10, wherein along a radial direction:

the blade root comprises a plurality of stages of the protruding parts including the at least one stage of the protruding parts and a second stage of the protruding parts, a first one of the protruding parts of the at least one stage of the protruding parts is adjacent to a second one of the protruding parts of the second stage of the protruding parts with a concave portion of the blade root therebetween, and a concave surface of the concave portion faces the radially inside.

* * * * *